US005695657A

United States Patent [19]
Shibata et al.

[11] Patent Number: 5,695,657
[45] Date of Patent: Dec. 9, 1997

[54] THIN FILM MAGNETIC HEAD AND METHOD FOR PRODUCING SAME

[75] Inventors: Takuji Shibata; Yoshihiro Kanno; Tadayuki Honda; Akio Takada; Yukio Kondo; Tadao Suzuki, all of Miyagi, Japan

[73] Assignee: Sony Corporation, Tokyo, Japan

[21] Appl. No.: 670,937

[22] Filed: Jun. 27, 1996

[30] Foreign Application Priority Data

Jun. 29, 1995 [JP] Japan .................................. 7-164142

[51] Int. Cl.⁶ ........................... G11B 5/39; B44C 1/22
[52] U.S. Cl. ....................... 216/22; 360/113; 29/603.07
[58] Field of Search ............................. 216/22; 360/113; 29/603.07

[56] References Cited

U.S. PATENT DOCUMENTS

| | | |
|---|---|---|
| 5,337,203 | 8/1994 | Kitada et al. . |
| 5,351,158 | 9/1994 | Shibata ................................. 360/113 |
| 5,402,292 | 3/1995 | Komoda et al. ........................ 360/113 |
| 5,535,077 | 7/1996 | Saito et al. ............................. 360/113 |

FOREIGN PATENT DOCUMENTS 1 423 879   4/1991   European Pat. Off. .

Primary Examiner—R. Bruce Breneman
Assistant Examiner—Michael E. Adjodha
Attorney, Agent, or Firm—Hill, Steadman & Simpson

[57] ABSTRACT

A magneto-resistance effect type thin-film magnetic head for detecting reproduced signals by the magneto-resistance effect, which is suitable for detecting reproduced signals by magneto-resistance effects, is disclosed. The thin-film magnetic head includes a two-layered magneto-resistance effect element made up of a first magneto-resistance effect film and a second magneto-resistance effect film of substantially the same width as the first magneto-resistance effect film, layered with a non-magnetic insulating film in-between. Since the magneto-static coupling is produced between the first and second MR films, the magnetic state between the first and second MR films is stabilized. The film thickness contributing to the playback output can be reduced as in the case of a single-layer magnetic head constituted by a single-layer MR film for realizing a high playback output.

6 Claims, 12 Drawing Sheets

THIN FILM MAGNETIC HEAD AND METHOD FOR PRODUCING SAME

BACKGROUND OF THE INVENTION

This invention relates to a magneto-resistance effect type thin-film magnetic head for detecting reproduced signals by the magneto-resistance effect, which is suitable for detecting reproduced signals by magneto-resistance effects.

DESCRIPTION OF THE RELATED ART

In a magnetic recording device, such as a hard disc device, a higher recording density in magnetic recording is desired for increasing the recording capacity. Recently, a magneto-resistance effect type thin-film magnetic head (MR head), which is a magnetic head suited for narrowing the track width for achieving higher recording density, is becoming popular.

Basically, this MR head is comprised of an electrode 102 mounted on each end of a magneto-resistance effect film (MR film) whose resistivity is changed with the strength of the magnetic field, as shown in FIG. 1. The sense current is supplied from both end electrodes 102 to this MR film 101 for detecting changes in resistance of the MR film 101 by the signal magnetic field from the magnetic recording medium for producing the playback output based on such changes in resistance. Such MR head has a feature that the playback output is not dependent on the running speed of the recording medium such that a high playback output may be realized even for a low running speed of the recording medium.

Meanwhile, the MR film is magnetically unstable such that the magnetic wall in the MR film is moved by the external magnetic field. Thus the MR head has a drawback that the Barkhausen noise is produced due to such movement of the MR film. It is therefore a crucial task with the MR head to secure magnetic stability of the MR film to reduce the Barkhausen noise.

Thus, for securing magnetic stability of the MR film, a so-called two-layered type MR head having a double-layered MR film has been developed. With the two-layered MR head, the first MR film 103, non-magnetic insulating film 104 and the second MR film 105 are layered to form a two-layer MR element 106, and the electrode 102 is mounted for covering both ends of the two-layer MR element 106, as shown in FIG. 2, which is a cross-sectional view taken along line B—B in FIG. 1. With the two-layer type magnetic head in which the MR film has a dual layer structure, the first MR film 103 and the second MR film 105 become magnetically stable under the magneto-static coupling between these first and second MR film, thus reducing the Barkhausen noise.

For achieving a high recording density, it is necessary to reduce the gap width for improving linear recording density. However, if the magnetic gap of the MR head is reduced, the playback output is lowered. On the other hand, such a magnetic recording medium is becoming popular, in which, for improving linear recording density, the coercivity Hc is large and the residual magnetic flux density Br is small. However, with the magnetic recording medium having the small residual magnetic flux density Br, the signal magnetic field from the magnetic recording medium becomes small.

In this consideration, a higher playback output is required of the MR head. For increasing the playback output of the MR head, it suffices to further reduce the film thickness of the MR film. That is, by reducing the film thickness of the MR film, the current density of the sense current flowing in the MR film is raised, thus improving the playback output of the MR head.

However, with the above-described two-layered MR head, the total film thickness of the MR films contributing to the playback output becomes approximately double that of the single layer MR film. Thus it becomes difficult with the conventional two-layered MR head to realize a high playback output.

With the single-layer MR head, constituted by the single-layer MR film, the MR film can be reduced in film thickness, so that a high playback output can be realized. However, there is also a problem that the noise tends to be produced because of poor magnetic stability of the MR film. On the other hand, with the two-layered MR head having a two-layered MR film, the total film thickness of the MR films contributing to the playback output is increased, such that a high playback output cannot be achieved, even although the MR film is superior in magnetic stability and hence the noise is reduced. That is, with the conventional MR head, it has been difficult to achieve both the improved magnetic stability of the MR film and high playback output simultaneously.

SUMMARY OF THE INVENTION

It is therefore an object of the present invention to provide a thin film magnetic head superior in magnetic stability of the MR film and which is capable of achieving a high playback output, and a method for producing the magnetic head.

In one aspect, the present invention provides a thin-film magnetic head including a two-layered magneto-resistance effect element made up of a first magneto-resistance effect film and a second magneto-resistance effect film of substantially the same width as the first magneto-resistance effect film, layered with a non-magnetic insulating film in-between, a non-magnetic insulating layer arranged on a lateral side of the two-layered magneto-resistance effect element, and a pair of electrodes arranged on both ends of the upper surface of the two-layered magneto-resistance effect element and connected to the second magneto-resistance effect film. The playback signal is detected by the magneto-resistance effect of the second magneto-resistance effect film.

In another aspect, the present invention provides a method for producing a thin-film magnetic head having a two-layered magneto-resistance effect element made up of a first magneto-resistance effect film and a second magneto-resistance effect film layered together, wherein the playback signals are detected by the magneto-resistance effect of the second magneto-resistance effect film. The method included the steps of layering the first magneto-resistance effect film and the second magneto-resistance effect film in this sequence to form a two-layered magneto-resistance effect film, and forming a protective layer on the two-layered magneto-resistance effect film, forming a non-magnetic insulating layer for overlying the resist, protective layer and the two-layered magneto-resistance effect element, peeling and removing the resist along with the non-magnetic insulating layer formed on the resist, removing the protective layer on both ends of the two-layered magneto-resistance effect element by etching for exposing the two-layered magneto-resistance effect film, and forming a pair of electrodes connected to the second magneto-resistance effect film on both ends of the two-layered magneto-resistance effect element.

In still another aspect, the present invention provides a method for producing a thin-film magnetic head having a two-layered magneto-resistance effect element made up of a first magneto-resistance effect film and a second magneto-resistance effect film layered together, wherein the playback signals are detected by the magneto-resistance effect of the second magneto-resistance effect film, and wherein the method includes the steps of layering the first magneto-resistance effect film and the second magneto-resistance effect film in this sequence to form a two-layered magneto-resistance effect film, and forming a protective layer on the two-layered magneto-resistance effect film, etching the two-layered magneto-resistance effect film and the protective layer to a pre-set shape to form a two-layered magneto-resistance effect element of a pre-set shape having a protective layer formed thereon, forming a non-magnetic insulating layer for covering the protective layer and the two-layered magneto-resistance effect element, forming a non-magnetic insulating layer for covering the protective layer and the two-layered magneto-resistance effect element, coating a resist on the non-magnetic insulating layer and subsequently reducing step differences on the surface of the non-magnetic insulating layer by etchback, removing the protective layer on both ends of the two-layered magneto-resistance effect element for exposing said second magneto-resistance effect layer, and forming a pair of electrodes connected on both ends of the two-layered magneto-resistance effect element to the second magneto-resistance effect film.

In yet another aspect, the present invention provides a method for producing a thin-film magnetic head having a two-layered magneto-resistance effect element made up of a first magneto-resistance effect film and a second magneto-resistance effect film layered together, wherein the playback signals are detected by the magneto-resistance effect of the second magneto-resistance effect film, and wherein the method includes the steps of layering the first magneto-resistance effect film and the second magneto-resistance effect film in this sequence to form a two-layered magneto-resistance effect film, and forming a protective layer on the two-layered magneto-resistance effect film, etching the two-layered magneto-resistance effect film and the protective layer to a pre-set shape to form a two-layered magneto-resistance effect element of a pre-set shape having a protective layer formed thereon, forming a non-magnetic insulating layer for covering the protective layer and the two-layered magneto-resistance effect element, polishing the surface of the non-magnetic insulating layer for reducing step differences for reducing the step differences on the surface of the non-magnetic insulating layer, removing the protective layer on both ends of the two-layered magneto-resistance effect element by etching for exposing the second magneto-resistance effect film, and forming a pair of electrodes connected to the second magneto-resistance effect film on both ends of the two-layered magneto-resistance effect element.

With the thin-film magnetic head of the present invention, the first MR film and the second MR film may be improved in magnetic stability under the magneto-static coupling of the first and second MR films. In addition, with the present thin-film magnetic head, the electrode is connected only to the second MR film, and only the second MR film operates as the magnetically sensitive portion of the MR head, so that film thickness of the second MR film alone represents the film thickness contributing to the playback output. Therefore, with the present thin-film magnetic head, the film thickness of the MR film contributing to the playback output may be reduced, as in the case of the single-layer MR head constituted by the single-layer MR film.

Similarly, with the method for producing a thin-film magnetic head according to the present invention, the first MR film and the second MR film may be improved in magnetic stability under the magneto-static coupling of the first and second MR films. In addition, with the thin-film magnetic head produced by the producing method, the electrode is connected only to the second MR film, and only the second MR film operates as the magnetically sensitive portion of the MR head, so that film thickness of the second MR film alone represents the film thickness contributing to the playback output. Therefore, with the thin-film magnetic head, produced by the present method, the film thickness of the MR film contributing to the playback output may be reduced, as in the case of the single-layer MR head constituted by the single-layer MR film.

Furthermore, with he method for producing the thin-film magnetic head according to the present invention, since the two-layered MR film and the protective film are first formed and subsequently a two-layered MR element of a pre-set shape having a protective layer formed on its surface is formed by etching, the second MR film can be made to register with the first MR element. Specifically, with the method fop producing the thin-film magnetic head of the present invention, a two-layered MR element in which the first MR film of the same shape as the second MR element is arranged directly below the second MR element, with a non-magnetic insulating layer in-between, can be formed easily.

With the thin-film magnetic head according to the present invention, since the magneto-static coupling is produced between the first and second MR films, the magnetic state between the first and second MR films is stabilized. The film thickness contributing to the playback output can be reduced as in the case of a single-layer magnetic head constituted by a single-layer MR film, thereby realizing a high playback output.

Thus the thin-film magnetic head according to the present invention is of low noise and high playback output, while being capable of realizing improved magnetic stability of the MR films and increased playback output simultaneously.

BRIEF DESCRIPTION OF THE DRAWINGS

FIGS. 5 to 14 illustrate the production process of the two-layer MR head shown in FIG. 3, wherein FIG. 5 is a transverse cross-sectional view showing a step of forming a lower gap layer.

FIG.6 is a transverse cross-sectional view showing a step of forming a two-layered MR film and a protective layer.

FIG. 7 is a cross-sectional perspective view showing essential portions for illustrating a step of forming a photoresist layer of a pre-set shape.

FIG. 8 is a cross-sectional perspective view showing the state in which the protective layer and the two-layered MR film have been etched.

FIG. 9 is a cross-sectional perspective view showing the step of forming a non-magnetic insulating layer.

FIG. 10 is a cross-sectional perspective view showing the state in which the photoresist and the non-magnetic insulating layer on the photoresist have been removed.

FIG. 11 is a transverse cross-sectional view showing the state in which the photoresist and the non-magnetic insulating layer on the photoresist have been removed.

FIG. 12 is a schematic transverse cross-sectional view illustrating the step of forming a non-magnetic insulating layer and an opening.

FIG. 13 is a transverse cross-sectional view showing the step of forming a conductor layer for the sense current, conductor layer for the bias current and a non-magnetic insulating layer.

FIG. 14 is a transverse cross-sectional view showing the step of forming an upper gap layer and an upper shield layer.

DESCRIPTION OF THE PREFERRED EMBODIMENTS

Figure 1:
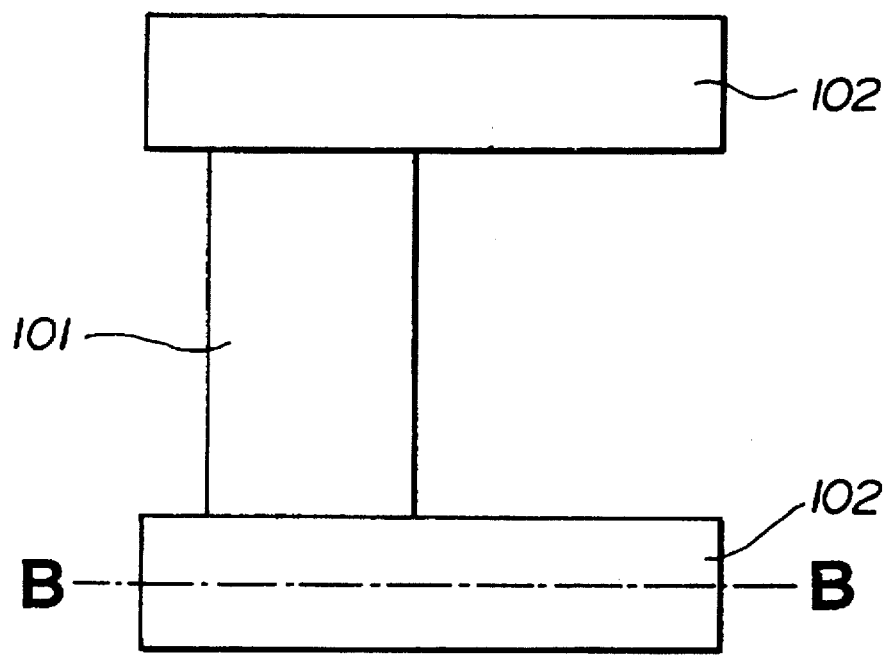
FIG. 1 is a schematic view showing a basic structure of an MR head.
Figure 2:
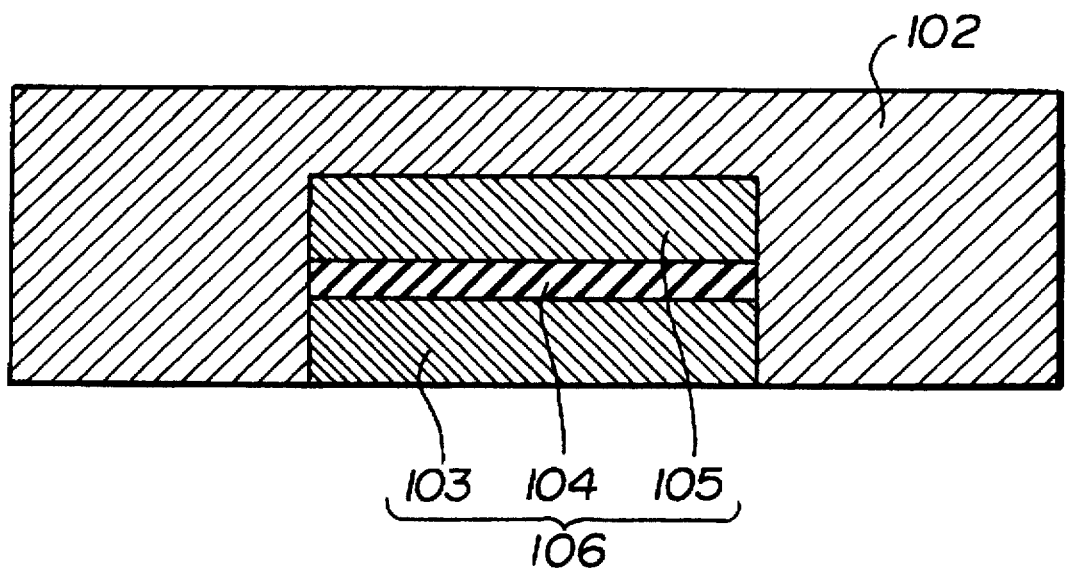
FIG. 2 is a cross-sectional view of MR films of a conventional two-layer magnetic head.

Referring to the drawings, preferred embodiments of the present invention will be explained in detail. It is to be noted that the present invention is not limited to the embodiments now explained and may be modified in shape or material type without departing from the scope of the invention.

Figure 3:
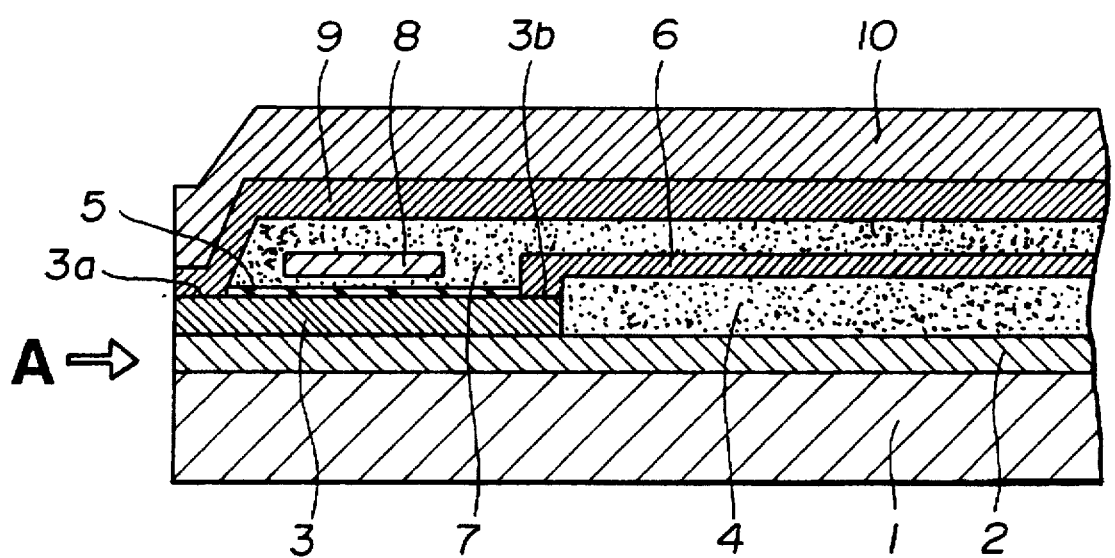
FIG. 3 is a schematic transverse cross-sectional view showing an embodiment of a two-layer MR head according to an embodiment of the present invention.

Referring to FIG. 3, the present thin-film magnetic head is a two-layered MR head having a two-layered MR element, and includes a lower-layer shield 1, a lower gap layer 2 formed thereon and a two-layered MR element 3 and a non-magnetic insulating layer 4 formed on the lower gap layer 2. The thin-film magnetic head also includes a protective layer 5 formed on portions of the two-layered MR element 3 other than its forward end 3a and rear end 3b, and a conductor layer for the sense current 6 formed on the non-magnetic insulating layer 4 from the rear end 3b of the two-layered MR element 3 so as to be connected to the forward end 3a of the two-layered MR element 3. The thin-film magnetic head further includes a non-magnetic insulating layer 7 formed on the two-layered MR element 3 and on the conductor layer for the sense current 6 and a conductor layer for the bias current 8, formed in the non-magnetic insulating layer 7, for overlying the two-layered MR element 3. The thin-film magnetic head also includes an upper gap layer 9 formed from the forward end 3a of the two-layered MR element 3 over the non-magnetic insulating layer 7 so as to be connected to the forward end 3a of the two-layered MR element 3 and an upper layer shield 10 formed on the upper gap layer 9.

In the above two-layer MR head, the lower layer shield 1 and the upper layer shield 10 are formed of a magnetic material, while the lower gap layer 2 and the upper gap layer 9 are formed of a non-magnetic insulating material and an electrically conductive non-magnetic material, respectively. The lower layer 1, upper layer shield 10, lower gap layer 2 and the upper gap layer 9 operate so that the signal magnetic field from the magnetic recording medium other than the signal magnetic field to be reproduced will not be seized by the two-layered MR element 3. That is, since the lower layer shield 1 and the upper layer shield 10 are arrayed above and below the two-layered MR element 3 via the lower gap layer 2 and the upper gap layer 9, the signal magnetic field from the magnetic recording medium other than the signal magnetic field to be reproduced is supplied to the lower layer shield 1 and the upper layer shield 10 so that only the magnetic field to be reproduced is seized by the two-layered MR element 3.

The conductor layer for the sense current 6 and the upper gap layer 9 are a pair of electrodes connected to both ends of the two-layered MR element 3 and operate for supplying the sense current to the MR element 3. That is, the two-layered MR element 3 has its rear end 3b electrically connected to the conductor layer for the sense current 6, while having its forward end 3a electrically connected to the upper gap layer 9. When the signal magnetic field is detected from the magnetic recording medium, the sense current is thereby supplied to the two-layered MR element 3. The two-layered MR element 3 has first and second MR films and the sense current is supplied only to the upper layer MR film, that is the second MR film.

The conductor layer for the bias current 8, formed in the non-magnetic insulating layer 7 for overlying the two-layered MR element 3, is used for applying a bias magnetic field to the two-layered MR element 3. That is, when detecting the signal magnetic field from the magnetic recording medium, the current is caused to flow through the conductor layer for the bias current 8 for applying the bias magnetic field across the two-layered MR element 3 for achieving a higher magneto-resistance effect.

Figure 4:
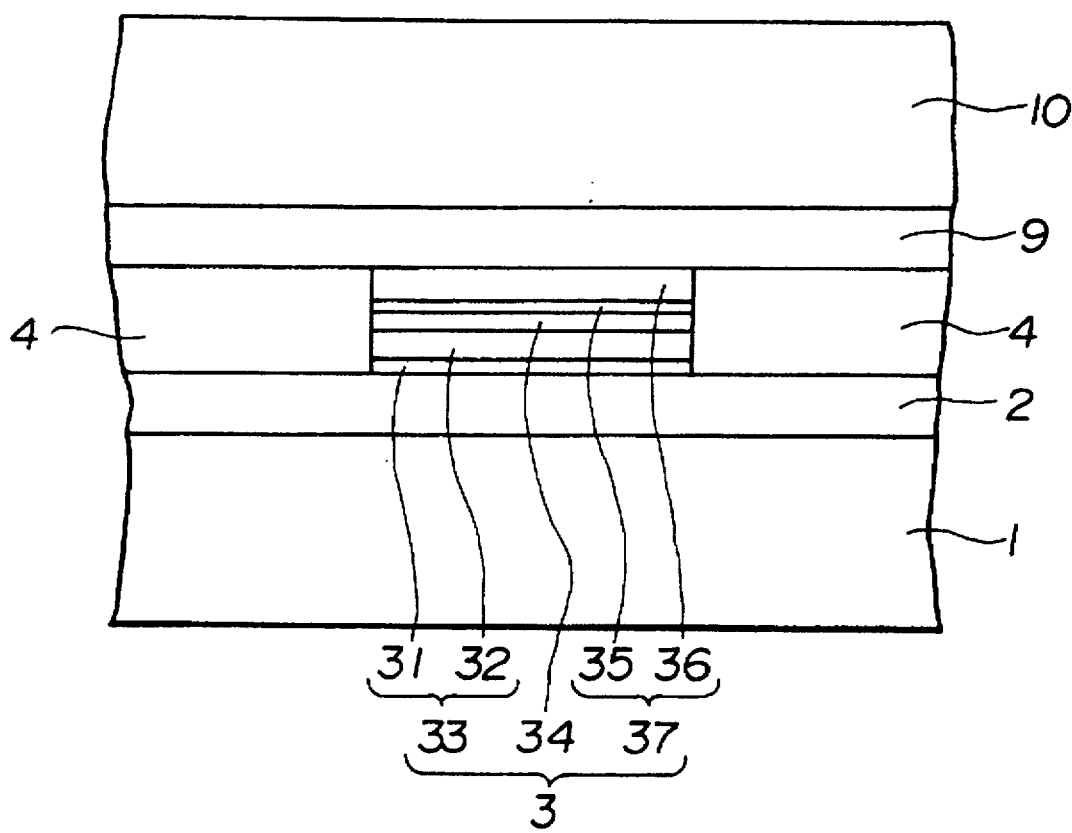
FIG. 4 is a schematic front view showing the two-layer magnetic head of FIG. 3, looking from the surface thereof on which slides a magnetic recording medium.

FIG. 4 shows the two-layered MR head from the side of the surface thereof on which slides the magnetic recording medium, as shown by arrow A in FIG. 3. FIG. 4 shows that the two-layered MR element 3 is made up of a first MR film 33, a non-magnetic insulating layer 34 of $Al_2O_3$, and a second MR film 37, layered in this order. The first MR film 33 is made up of a Ta underlying film 31 and an NiFe film of Ni80/Fe20 film 32 formed thereon, while the second MR film 37 is made up of a Ta underlying film 35 and an NiFe film of Ni80/Fe20 film 36 formed thereon. With such MR element 3, since the first MR film and the second MR film are formed of the same material, magnetic properties of both the first and second MR films 33, 37 can be controlled equivalently. With such two-layered MR element, the resistivity of approximately 25 μΩcm and the rate of change of resistivity of Δρ/ρ of approximately 2.5% can be achieved for the second MR film 37, which is the MR film contributing to the playback output.

As for the relation of the film thicknesses of the first and second MR films 33, 37, the film thickness of the first MR film 33 is preferably larger than that of the second MR film 37 since then the second magnetic film 37 is improved in magnetic stability. This is however not necessary and the first and second MR films 33, 37 may be of the same film thickness or the first MR film 33 may be thinner in thickness than the second MR film 37.

In the two-layered MR element 3, the underlying films 31, 35 of Ta are used for improving surface roughness. By providing such underlying layers 31, 35, it becomes possible to improve the surface roughness before forming the NiFe films 32, 36 for improving magnetic properties of the NiFe films 32, 36.

With the present two-layered MR element 3, the second MR film 37, as the upper MR film, functions as a magnetic sensitive portion of the magnetic head, and is fed with the sense current, as later explained. On the other hand, the first MR film 33, as the lower MR film, is magneto-statically coupled with the second MR film 37 for contributing to improved magnetic stability of the second MR film 37 functioning as a magnetically sensitive portion.

If suffices if the first MR film 33 and the second MR film 37 of the two-layered type MR element 3 are formed of a magnetic material exhibiting a magneto-resistance effect. Thus, these films may be formed of a material other than NiFe, or may be formed by plural thin films layered together.

If suffices if the non-magnetic insulating film 34, arranged between the first MR film 33 and the second MR element 37, is formed of an electrically insulating non-magnetic material. Thus the non-magnetic insulating film 34 may be formed of a material other than $Al_2O_3$. Although a thinner thickness of the non-magnetic insulating film 34 is desirable for reducing the gap width, the non-magnetic insulating film 34 needs to be not less than approximately 10 nm if it is formed of, for example, $Al_2O_3$, since the first and second MR films 33, 37 need to be insulated from the non-magnetic insulating film.

On both sides of the two-layered MR element 3 are arranged non-magnetic insulating layers 4, as shown in FIG. 4, such that the two-layered MR element 3 is buried in this non-magnetic insulating film 34. It is preferred that the two-layered MR element 3 be formed of a material superior in sliding performance since it is exposed on the surface of the head surface on which slides the magnetic head. For example, such materials as $Al_2O_3$, $SiO_2$ or $SiN_x$ (e.g., $Si_3N_4$) are preferred.

On both ends of the upper surface of the two-layered MR element 3, the second MR film 37 is connected to the conductor. That is, the upper surface of the second MR film 37 and the upper gap layer 9 are electrically connected at the forward end 3a of the two-layered MR element 3, as shown in FIGS. 3 and 4, while the upper surface of the second MR film 37 is electrically connected with the conductor layer for the sense current 6 at the rear end 3b thereof, as shown in FIG. 3. Since the first MR film 33 has its lateral side and its upper surface insulated respectively by the non-magnetic insulating layer 4 and by the non-magnetic insulating film 34, no sense current flows through the first MR element 33.

With the two-layered MR head, employing the two-layered MR element 3, since magneto-static coupling is produced between the first MR film 33 and the second MR film 37, magneto-static stability of the first MR film 33 and the second MR film 37 is improved, thus reducing the Barkhausen noise.

In addition, with the present two-layered MR head, the sense current is supplied only to the second MR film 37, which thus operates as a magnetically sensitive portion. Therefore, with the present two-layered MR head, the film thickness of the MR film contributing to the playback output is only the film thickness of the second MR film 37. Thus it becomes possible with the present two-layered MR head to reduce the film thickness of the MR film 37 contributing to the playback output to the level of that of the single-layered MR head made up only of a single-layer MR film. By reducing the film thickness contributing to the playback output, a higher playback output may be achieved with the present two-layered MR head since the sense current may then be improved in current density.

An embodiment of the method for producing the above-described MR head is explained in detail.

Figure 5:
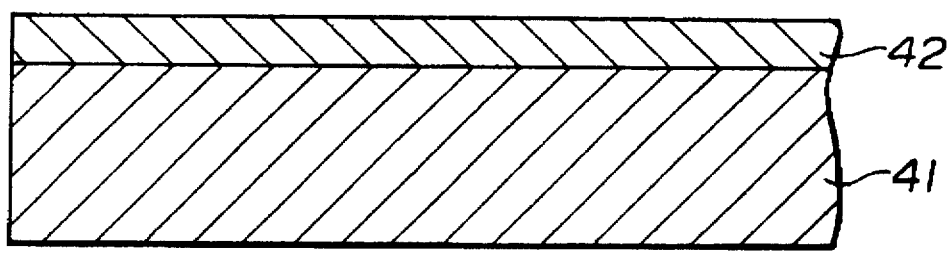

For producing the two-layered MR head, a lower gap layer 42, formed of a non-magnetic insulating material, such as $Al_2O_3$, is formed on the lower layer shield 41, as shown in FIG. 5. The lower gap layer 42 electrically insulates the lower portion of the two-layered MR element 3, to be formed in the subsequent step, while forming a magnetic gap at a lower portion of the two-layered MR element 3.

Figure 6:
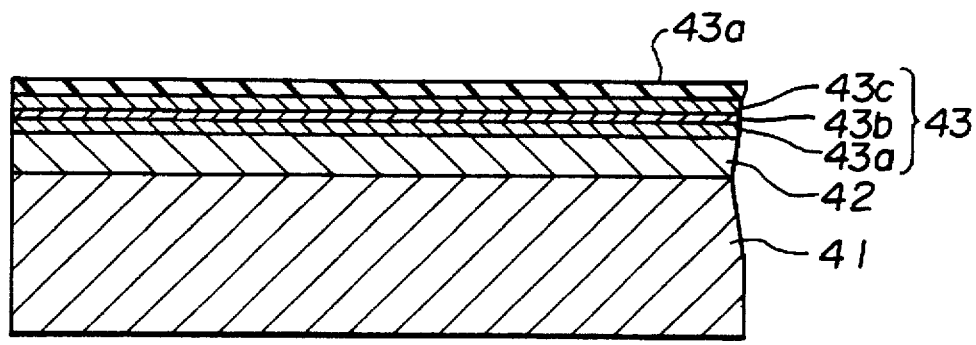

Then, as shown in FIG. 6, a two-layered MT R film 43 is formed on the lower gap layer 42, and a protective layer 44, formed of $Al_2O_3$, is formed on the two-layered MR film 43. The two-layered MR film 43 is etched during the subsequent step to form a two-layered MR element, and is made up of a layered structure of a first MR film 43a, composed of an underlying film of Ta and an NiFe film, a non-magnetic insulating film 43b of $Al_2O_3$ and a second MR film 43c composed of an underlying film and an NiFe film.

Figure 7:
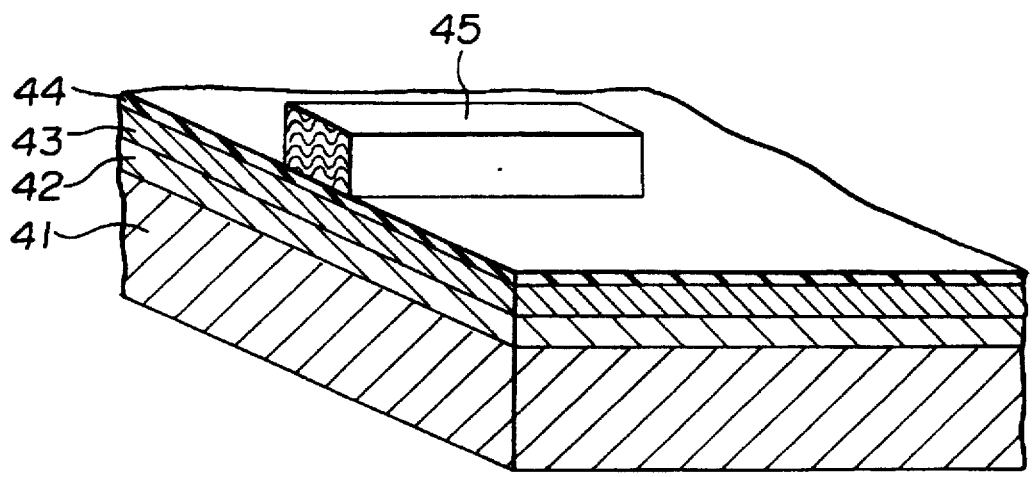
Figure 8:
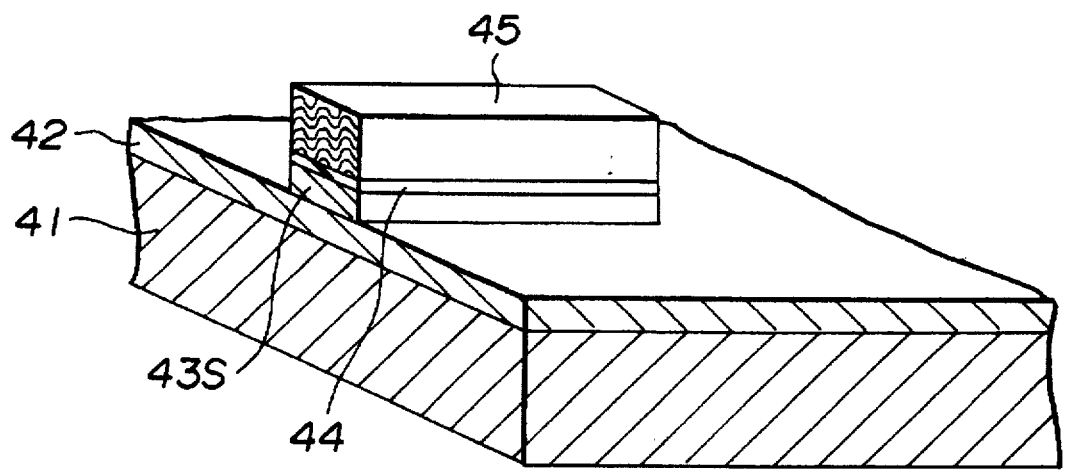

Then, for forming the two-layered MT R film 43 into a two-layered MR element of a pre-set shape, a photoresist 45 patterned to a pre-set shape is formed on a protective layer 44, as shown in FIG. 7. The protective layer 44 and the two-layered MR film 43 are then etched, as shown in FIG. 8, for forming a two-layered MR element 43S of a pre-set shape on the upper surface of which the protective layer 44 has been formed.

By pre-forming the two-layered MR film 43, and by subsequently etching the film to form the two-layered MR element 43S of a pre-set shape, the first MR film 43a can be in register correctly with the second MR element 43c. Thus, with the two-layered MR element 43S, ideal magneto-static coupling may be established between the first MR film 43a and the second MR film 43b.

Figure 9:
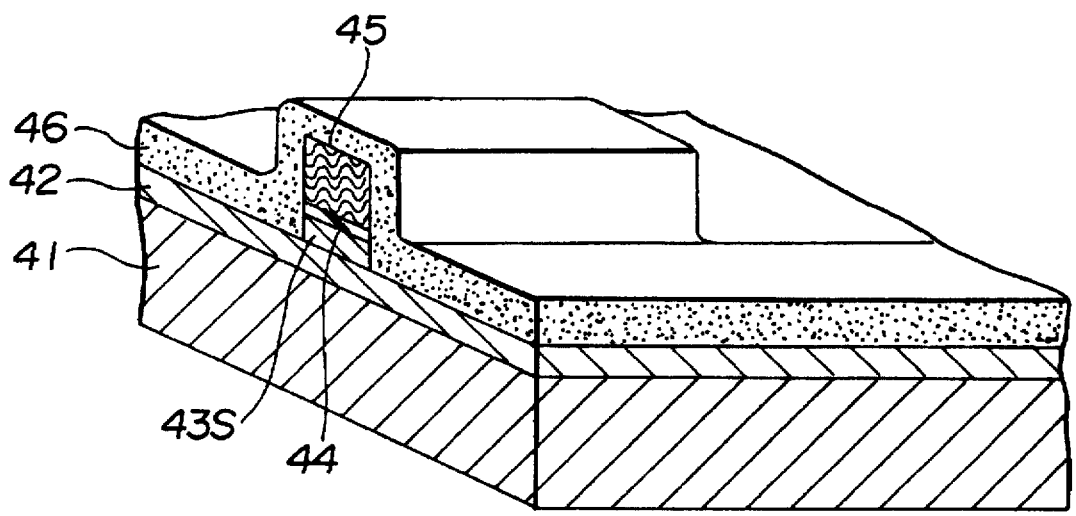
Figure 10:
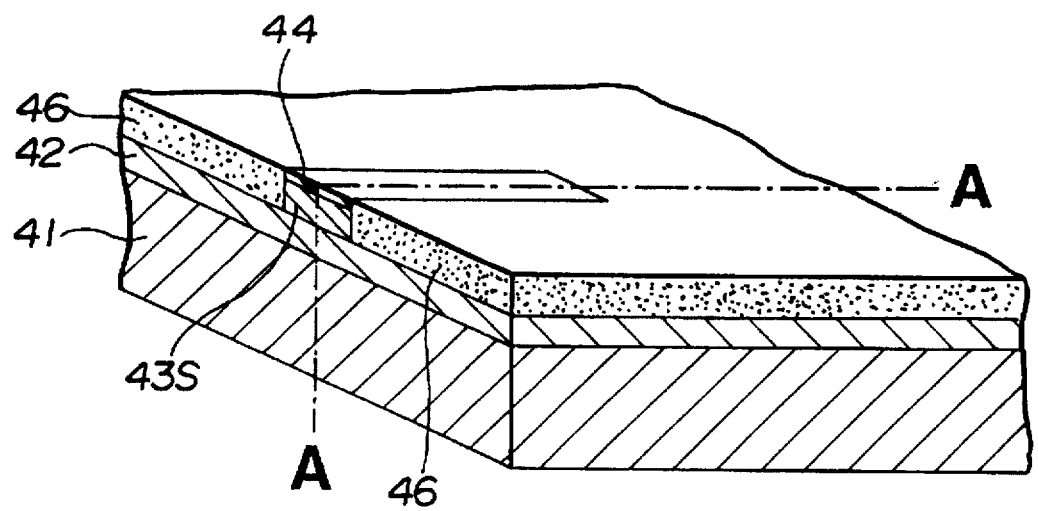

Then, as shown in FIG. 9, a non-magnetic insulating layer 46 is formed for overlying the photoresist layer 45, protective layer 44 and the two-layered MR element 43S. The photoresist 45 is then peeled off and removed, along with the non-magnetic insulating layer 46. After peeling and removing the photoresist 45 along with the non-magnetic insulating layer 46 formed thereon, the surfaces of the non-magnetic insulating layer 46 and the protective layer 44 are planarized by polishing. Thus, as shown in FIG. 10 and in FIG. 11 which is a cross-sectional view taken along line A—A in FIG. 10, the two-layered MR element 43S and the protective layer 44 are buried in the non-magnetic insulating layer 46.

With the so-called lift-off technique, in which the photoresist layer 45 is peeled and removed along with the non-magnetic insulating layer 46 formed thereon, the state in which the two-layered MR element 43S and the protective layer 44 are buried in the non-magnetic insulating layer 46 can be established easily. However, with such lift-off technique, burrs or the like tend to be formed in edge portions produced on peeling the photoresist, thus adversely affecting surface roughness, magnetic properties or insulating properties of the two-layered MR element 43S or the shape of the upper gap payer or the upper layer shield formed by the subsequent steps. Thus, in the present embodiment, the surfaces of the non-magnetic insulating layer 46 and the protective layer 44 are polished after peeling the photoresist layer 45 for improving surface properties.

It should be noted that, if the surfaces of the non-magnetic insulating layer 46 and the protective layer 44 are polished after peeling the photoresist layer 45, as in the present embodiment, it is necessary to use a thicker thickness of the protective layer 44 in advance in consideration of the amount of polishing by the present process step. Specifically, if the protective layer 44 of, for example, $Al_2O_3$ is used, it is preferred for the ultimate film thickness of the protective layer 44 to be on the order of 20 nm, while the amount of polishing of approximately 50 nm is necessary in order to have a sufficiently planar surface by the polishing of the present process step. Therefore, if the photoresist layer 45 is first peeled off and the surfaces of the non-magnetic insulating layer 46 and the protective layer 44 are subsequently polished, it is necessary to form the protective layer 44 of $Al_2O_3$ to a film thickness on the order of 70 nm in advance and the protective layer is polished and planarized in the present process step by approximately 50 nm in order to provide an ultimate film thickness of the protective layer 44 on the order of 20 nm.

By polishing the surfaces of the non-magnetic insulating layer 46 and the protective layer 44 in this manner, magnetic properties or insulating properties of the two-layered MR element 43S may be improved, while an ideal shape of the upper layer shield formed by the subsequent step may be realized for improving frequency characteristics of the two-layered magnetic head.

Figure 12:
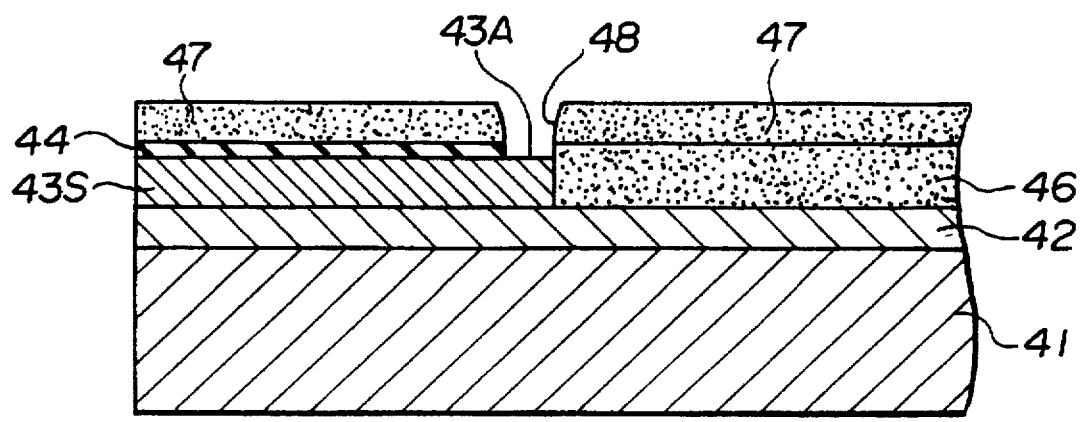

The, as shown in FIG. 12, a new non-insulating layer 47 is formed in the non-magnetic insulating layer 48 and the protective layer 44, after which the non-magnetic insulating layer 47 and the protective layer 44 at the rear end 43A of the two-layered MR element 43S are etched to form an opening 48 for exposing a rear end 43A of the two-layered MR element 43S.

Figure 13:
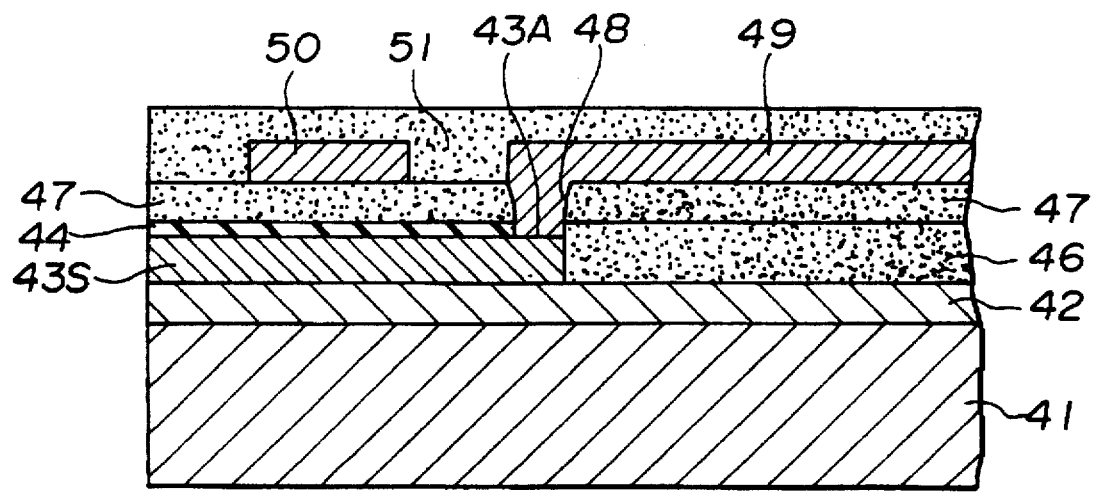

Then, as shown in FIG. 13, a conductor layer for the sense current 49 is formed on the rear end 43A of the two-layered MR element 43S so as to be contacted with the upper surface of the two-layered MR element 43S via an opening 48 formed during the previous step. A conductor layer for bias current 50 is also formed for overlying the upper portion of the two-layered MR element 43S. A non-magnetic insulating layer 51 is further formed thereon.

Figure 14:
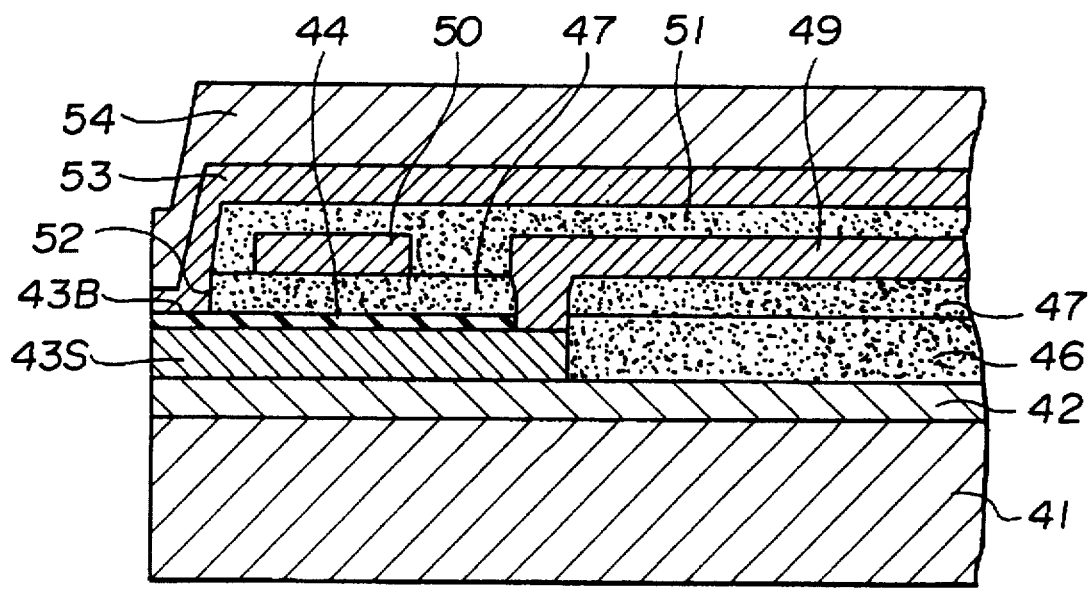

Then, as shown in FIG. 14, the non-magnetic insulating layer 51, non-magnetic insulating layer 47 and the protective layer 44 on the forward end 43B of the two-layered MR element 43S are etched for forming an opening 52 for exposing the forward end 43B of the two-layered MR element 43S. An upper gap layer 53 is formed on the forward end 43B of the two-layered MR element 43S and on the non-magnetic insulating layer 51 so as to be contacted via the opening 52 with the upper surface of the two-layered MR element 43S, and an upper layer shield 54 is further formed thereon.

After the above process step, a two-layered MR head is completed by a slicing step. Since the two-layered MR head is a playback-only magnetic head, a recording inductance may be layered on the two-layered MR head for providing a recording/reproducing magnetic head.

Figure 11:
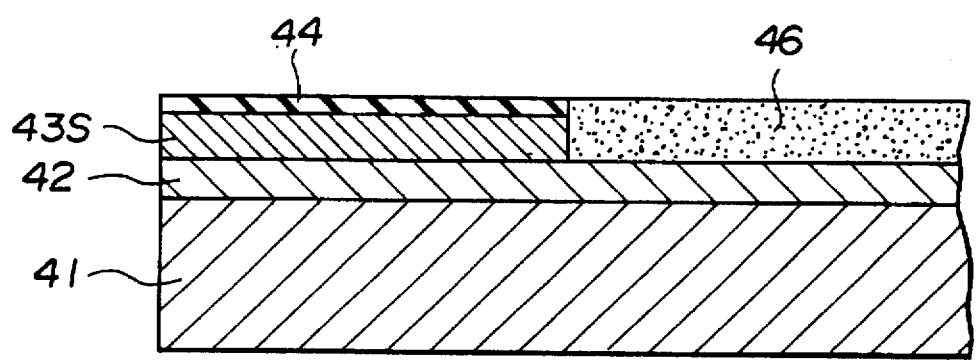

In the above-described method for producing the above-described two-layered MR head, the non-magnetic insulating layer is formed, with the photoresist being kept intact, so that the two-layered MR element 43S and the protective layer 44 are buried in the non-magnetic insulating layer 46, and the photoresist 45 is then removed along with the non-magnetic insulating layer 46 on the photoresist 45, as shown in FIGS. 10 and 11. However, the state in which the two-layered MR element 43S and the protective layer 44 are buried in the non-magnetic insulating layer 46 may be realized by techniques other than that described above.

Specifically, the state in which the two-layered MR element 43S and the protective layer 44 are buried in the non-magnetic insulating layer 46 may be realized by forming a non-magnetic insulating layer on the lower gap layer 42, two-layered MR element 43S and the protective layer 44 and by subsequently etching back this non-magnetic insulating layer.

Figure 15:
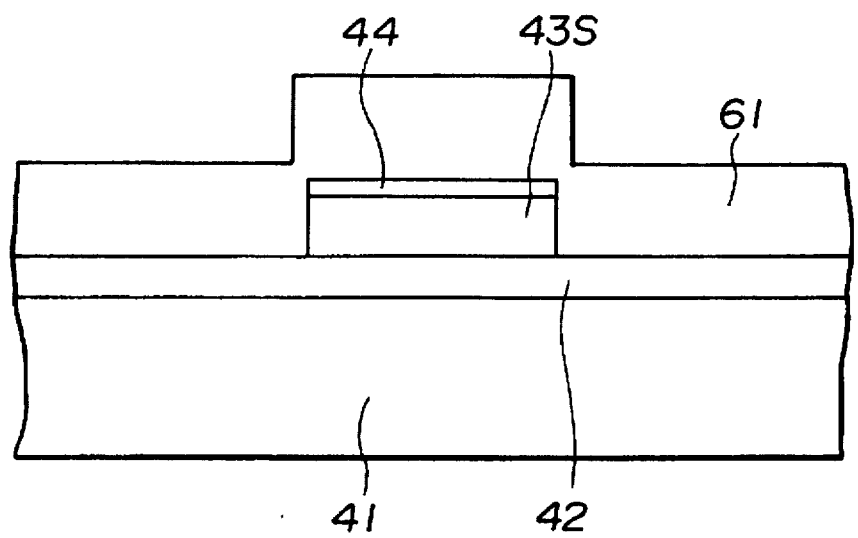
FIG. 15 illustrates another production process of a two-layer MR head shown in FIG. 3, and illustrates the state in which a non-magnetic insulating layer has been formed on the lower gap layer, two-layered MR element and the protective layer.
Figure 16:
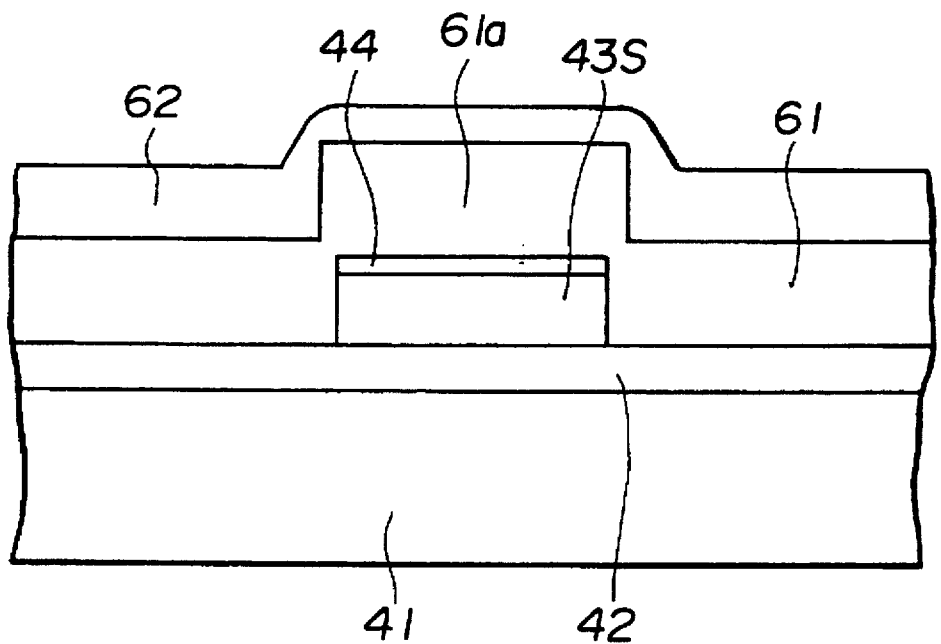
FIG. 16 illustrates a step next following the step shown in FIG. 15, showing the state in which a photoresist has been formed on a non-magnetic insulating layer.

That is, after forming the two-layered MR element 43S and the protective layer 44 and after removing the photoresist layer 45, a non-magnetic insulating layer 61 is formed for overlying the lower gap layer 42, two-layered MR element 43S and the protective layer 44, as shown in FIG. 15 which is a view looking from the surface of the magnetic head on which slides the magnetic medium. Then, as shown in FIG. 16, a photoresist 62 is formed on the non-magnetic insulating layer 61. The photoresist 62 is applied to a film thickness substantially equal to or slightly thinner than the film thickness of the two-layered MR element 43S in portions of the non-magnetic insulating layer 61 other than the portion overlying the two-layered MR element 43S. In this manner, the film thickness of the photoresist 62 becomes thicker in portions other than the portion overlying the two-layered MR element 43S and becomes thinner in the portion overlying the two-layered MR element 43S, as shown in FIG. 16.

With the entire surface of the resulting assembly covered by the photoresist 62, the entire surface of the assembly is etched back. For this etching, the etching rates for the photoresist 62 and that for the non-magnetic insulating layer 61 are properly selected for selectively etching the non-insulating layer 61a on the two-layered MR element 43S and the protective layer 44 for reducing surface step differences for planarization.

Figure 17:
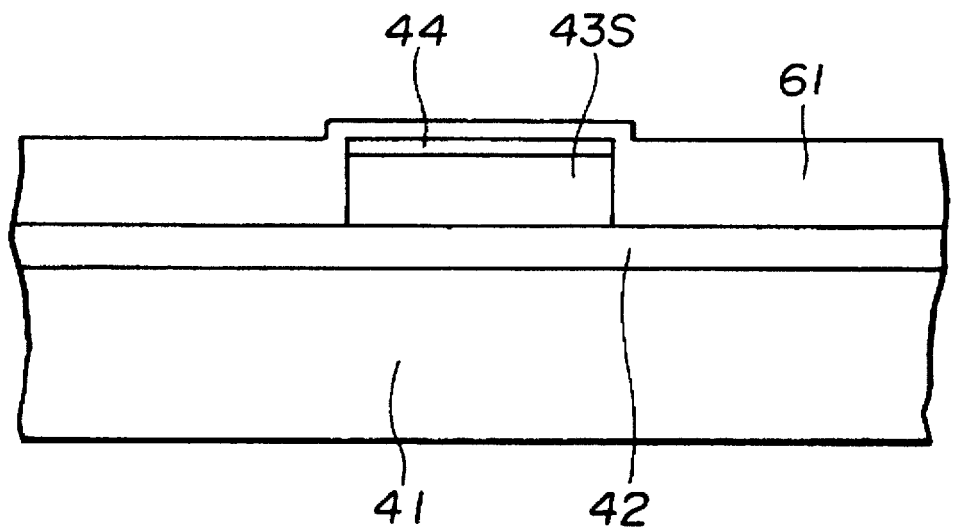
FIG. 17 illustrates a step next following the step shown in FIG. 15, showing the state in which the non-magnetic insulating layer has been planarized by etch-back.

As a result, the surface of the assembly is planarized and the state is reached in which the two-layer MR element 43S and the protective later 44 are buried in the non-magnetic insulating layer 61, as shown in FIG. 17. It suffices then to perform the process similar to that for the two-layered MR head.

For etchback, it suffices if the surface of the assembly is planarized substantially. The non-magnetic insulating layer 61 may be left on the protective layer 44.

If the non-magnetic insulating layer 61 is left on the protective layer 44, as shown in FIG. 17, it suffices if the portions of the non-magnetic insulating layer 61 in the vicinity of the opening 48 used for interconnecting the conductor layer for the sense current 49 and the two-layered MR element 43S and in the vicinity of the opening 52 for interconnecting the gap layer 53 and the two-layered MR element 43S are removed along with the protective layer 44 when these openings 48, 52 are formed in the subsequent process steps.

Alternatively, for producing the situation in which the two-layered MR element 43S and the protective layer 44 are buried in the non-magnetic insulating layer, it suffices to form the non-magnetic insulating layer on the lower magnetic layer 42, two-layered MR element 43S and the protective layer 44 and subsequently to polish the non-magnetic insulating layer.

Figure 18:
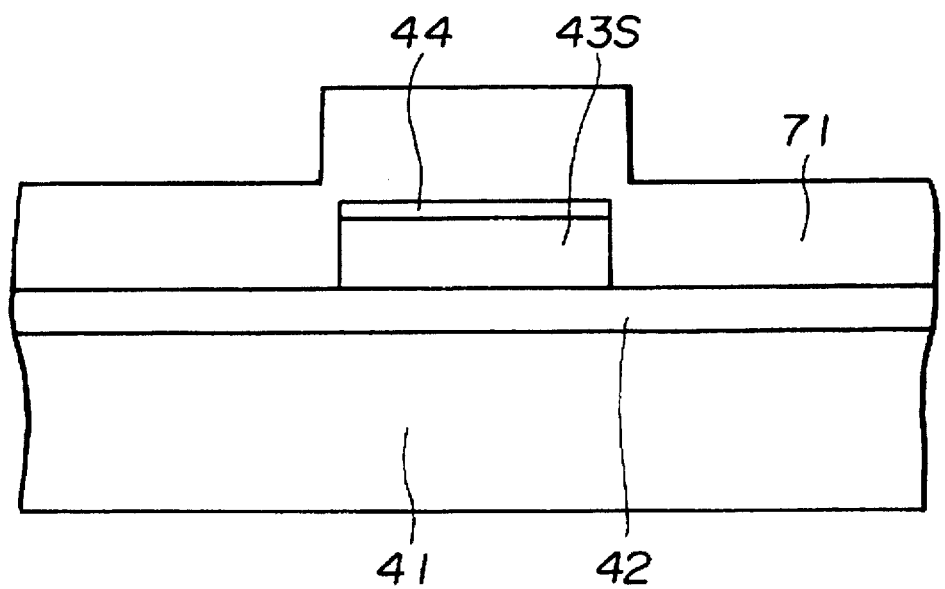
FIG. 18 illustrates a further production process of the two-layered MR head shown in FIG. 3, in which the non-magnetic insulating layer has been formed on the two-layered MR element and the protective layer.
Figure 19:
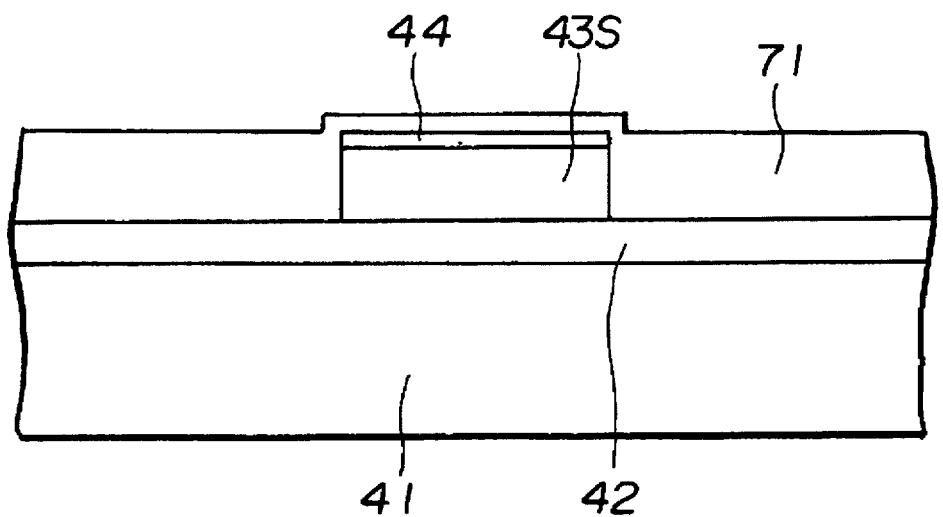
FIG. 19 is a schematic front view showing the step next to the step shown in FIG. 18 and showing the state in which the non-magnetic insulating layer has been planarized by surface polishing.

That is, after forming the two-layered MR element 43S and the protective layer 44 and subsequently removing the photoresist 45, a non-magnetic insulating layer 71 is formed for overlying the lower gap layer 42, two-layered MR element 43S and the protective layer 44 as shown in FIG. 18 which is a view looking from the surface of the MR head on which slides the magnetic medium. The entire surface of the assembly is then polished, as shown in FIG. 19 and planarized for diminishing surface step differences. This achieves such a state in which the entire surface of the assembly is substantially planarized and the two-layered MR element 43S and the protective layer 44 are buried in the non-magnetic insulating layer 61. Subsequently, it suffices to carry out process steps similar to those for the above two-layered MR head.

For planarizing the non-magnetic insulating layer 71, it suffices if the surface of the assembly is substantially planarized, while the non-magnetic insulating layer 71 may be left on the protective layer 44, as shown in FIG. 19. If the non-magnetic insulating layer 71 is left on the protective layer 44, as shown in FIG. 19, it suffices if the portions of the non-magnetic insulating layer 71 in the vicinity of the opening 48 used for interconnecting the conductor layer for the sense current 49 and the two-layered MR element 43S and in the vicinity of the opening 52 for interconnecting the gap layer 53 and the two-layered MR element 43S are removed along with the protective layer 44 when these openings 48, 52 are formed in the subsequent process steps.

With the above-described two-layered MR head, it is desirable for the first MR film and the second MR film to be magneto-statically coupled to each other for magnetically stabilizing the second MR film operating as a magnetically sensitive portion of the magnetic head. However, if the magneto-static coupling between the first MR film and the second MR film, the second MR film is not sufficiently stabilized magnetically. The strength of such magneto-static coupling is dependent on the ratio of the film thickness of the first MR film to that of the second MR film. Such ratio of the film thickness of the first MR film to that of the second MR film was actually checked. The results are shown in FIGS. 20 to 23.

Figure 20:
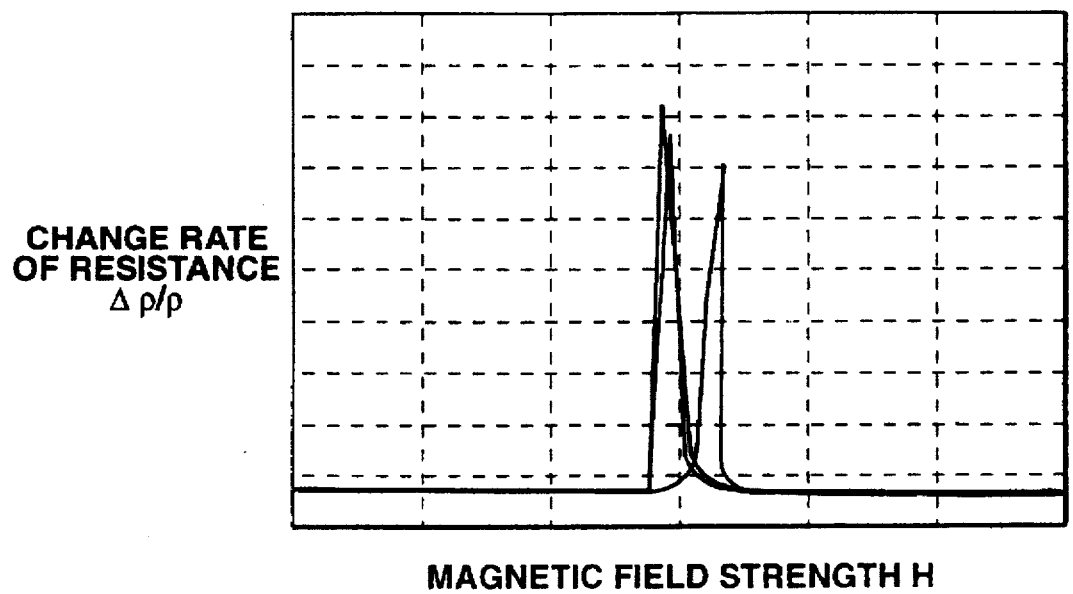
FIG. 20 is a graph showing the results of measurements of the magneto-resistance effect of the second MR film with the ratio of the film thickness of the second MR film to the film thickness of the first MR film being set to 1:0.50.
Figure 21:
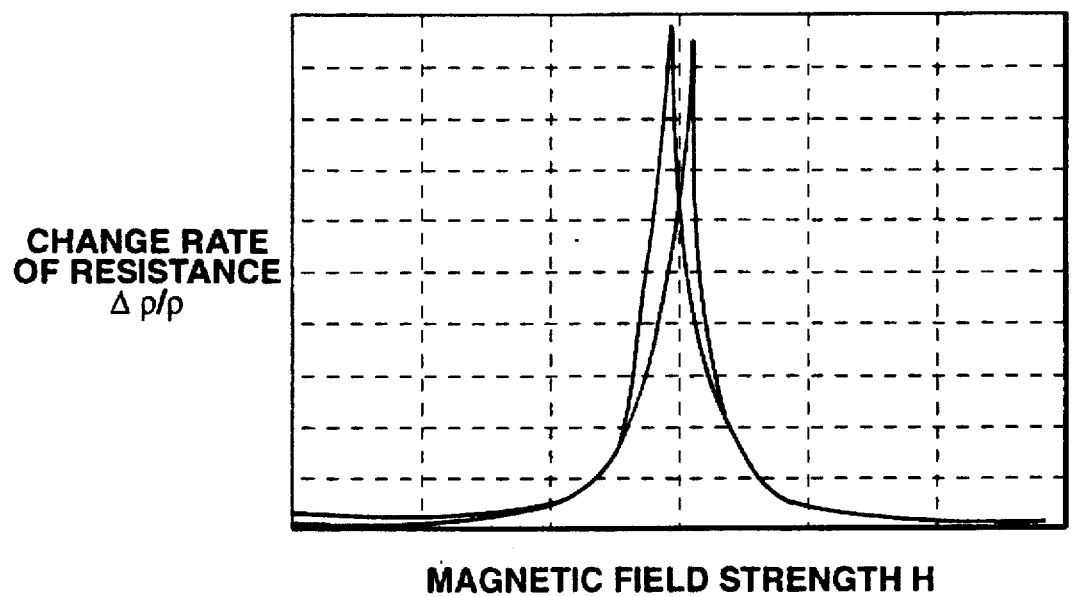
FIG. 21 is a graph showing the results of measurements of the magneto-resistance effect of the second MR film with the ratio of the film thickness of the second MR film to the film thickness of the first MR film being set to 1:0.75.
Figure 22:
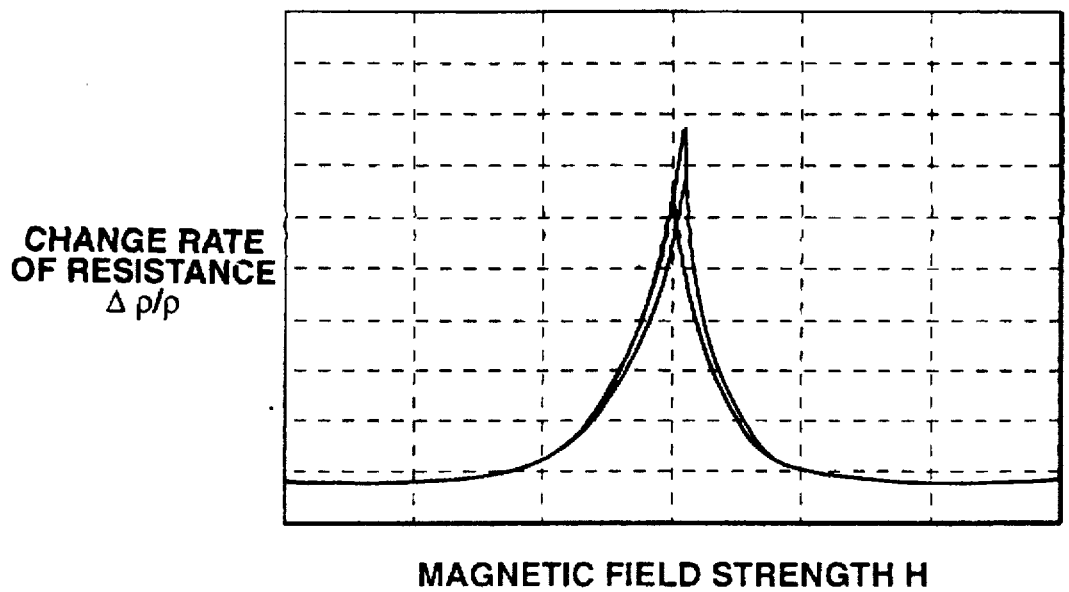
FIG. 22 is a graph showing the results of measurements of the magneto-resistance effect of the second MR film with the ratio of the film thickness of the second MR film to the film thickness of the first MR film being set to 1:1.
Figure 23:
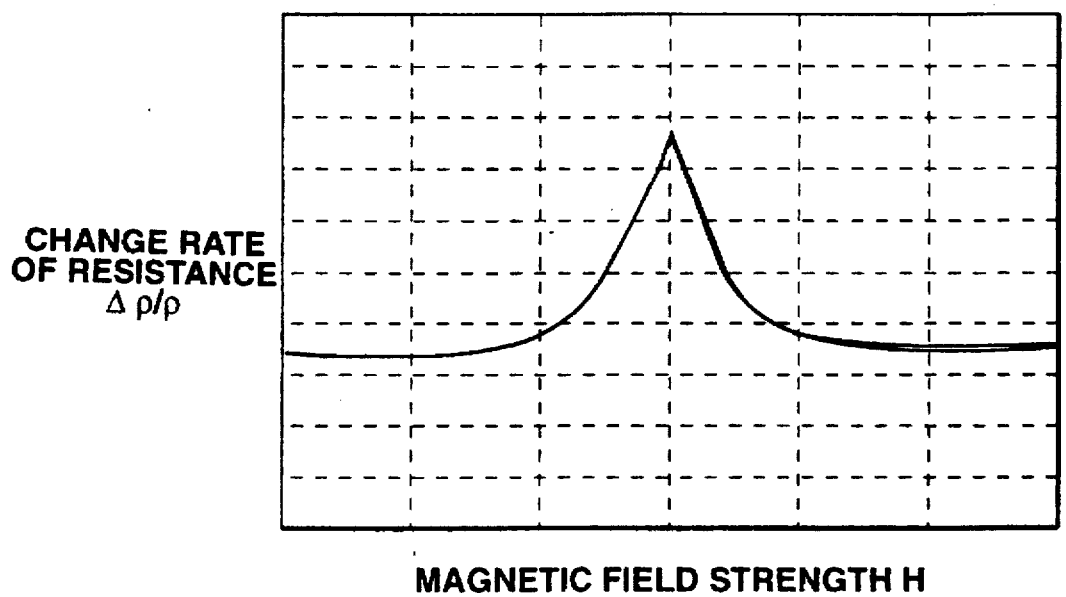
FIG. 23 is a graph showing the results of measurements of the magneto-resistance effect of the second MR film with the ratio of the film thickness of the second MR film to the film thickness of the first MR film being set to 1:1.25.

FIG. 20 shows the magneto-resistance effect of the second MR film for the ratio of the film thickness of the first MR film to that of the second MR film equal to 1:0.50, while FIG. 21 shows the magneto-resistance effect of the second MR film for the ratio of the film thickness of the first MR film to that of the second MR film equal to 1:0.75. On the other hand, FIG. 22 shows the magneto-resistance effect of the second MR film for the ratio of the film thickness of the first MR film to that of the second MR film equal to 1:1, while FIG. 23 shows the magneto-resistance effect of the second MR film for the ratio of the film thickness of the first MR film to that of the second MR film equal to 1:1.25. In FIGS. 20 to 23, the abscissa denotes the strength of the external magnetic field H, while the ordinate denotes the change in the rate of resistance $\Delta\rho/\rho$ of the second MR film caused by the magneto-resistance effect.

As may be seen from FIGS. 20 to 23, a thicker film thickness of the first MR film leads to stabilized magneto-resistance effect of the second MR layer. That is, the thicker the film thickness of the first MR film, the more stable is the magnetic stability of the second MR film, thus reducing the noise.

What is claimed is:

1. A method for producing a thin-film magnetic head having a two-layered magneto-resistance effect element made up of a first magneto-resistance effect film and a second magneto-resistance effect film layered together, wherein the playback signals are detected by the magneto-resistance effect of the second magneto-resistance effect film, comprising the steps of:

layering the first magneto-resistance effect film and the second magneto-resistance effect film in this sequence to form a two-layered magneto-resistance effect film, and forming a protective layer on said two-layered magneto-resistance effect film;

forming a non-magnetic insulating layer for overlying said resist, protective layer and said two-layered magneto-resistance effect element;

peeling and removing said resist along with the non-magnetic insulating layer formed on said resist;

removing the protective layer on both ends of said two-layered magneto-resistance effect element by etching for exposing said two-layered magneto-resistance effect film; and forming a pair of electrodes connected to said second magneto-resistance effect film on both ends of said two-layered magneto-resistance effect element.

2. The method for producing the thin-film magnetic head as claimed in claim 1 wherein, after peeling and removing said resist along with the non-magnetic insulating layer formed thereon, the surfaces of the non-magnetic insulating layer and the protective film are polished and thereby planarized.

3. A method for producing a thin-film magnetic head having a two-layered magneto-resistance effect element made up of a first magneto-resistance effect film and a second magneto-resistance effect film layered together, wherein the playback signals are detected by the magneto-resistance effect of the second magneto-resistance effect film, comprising the steps of:

layering the first magneto-resistance effect film and the second magneto-resistance effect film in this sequence to form a two-layered magneto-resistance effect film, and forming a protective layer on said two-layered magneto-resistance effect film;

etching said two-layered magneto-resistance effect film and said protective layer to a pre-set shape to form a two-layered magneto-resistance effect element of a pro-set shape having a protective layer formed thereon;

forming a non-magnetic insulating layer for covering the protective layer and the two-layered magneto-resistance effect element;

forming a non-magnetic insulating layer for covering said protective layer and said two-layered magneto-resistance effect element;

coating a resist on said non-magnetic insulating layer and subsequently reducing step differences on the surface of said non-magnetic insulating layer by etchback;

removing the protective layer on both ends of the two-layered magneto-resistance effect element for exposing said second magneto-resistance effect layer; and forming a pair of electrodes connected on both ends of the two-layered magneto-resistance effect element to said second magneto-resistance effect film.

4. A method for producing a thin-film magnetic head having a two-layered magneto-resistance effect element made up of a first magneto-resistance effect film and a second magneto-resistance effect film layered together, wherein the playback signals are detected by the magneto-resistance effect of the second magneto-resistance effect film, comprising the steps of:

layering the first magneto-resistance effect film and the second magneto-resistance effect film in this sequence to form a two-layered magneto-resistance effect film, and forming a protective layer on said two-layered magneto-resistance effect film;

etching said two-layered magneto-resistance effect film and said protective layer to a pre-set shape to form a two-layered magneto-resistance effect element of a pre-set shape having a protective layer formed thereon;

forming a non-magnetic insulating layer for covering the protective layer and the two-layered magneto-resistance effect element;

polishing the surface of said non-magnetic insulating layer for reducing step differences for reducing the step differences on the surface of said non-magnetic insulating layer;

removing the protective layer on both ends of said two-layered magneto-resistance effect element by etching for exposing said second magneto-resistance effect film; and forming a pair of electrodes connected to said second magneto-resistance effect film on both ends of said two-layered magneto-resistance effect element.

5. A thin-film magnetic head comprising:

a two-layered magneto-resistance effect element made up of a first magneto-resistance effect film and a second magneto-resistance effect film of substantially the same width as the first magneto-resistance effect film, layered with a non-magnetic insulating film in-between;

a non-magnetic insulating layer arranged on a lateral side of said two-layered magneto-resistance effect element; and a pair of electrodes arranged on both ends of the upper surface of said two-layered magneto-resistance effect element and connected to said second magneto-resistance effect film; wherein the improvement resides in that the playback signal is detected by the magneto-resistance effect of said second magneto-resistance effect film.

6. The thin-film magnetic head as claimed in claim 5 wherein the film thickness of the first magneto-resistance effect film is thicker than that of said second magneto-resistance effect film.

* * * * *